(No Model.)
G. H. CHAPPELL.
MECHANISM FOR CHANGING SPEED.
No. 441,281. Patented Nov. 25, 1890.
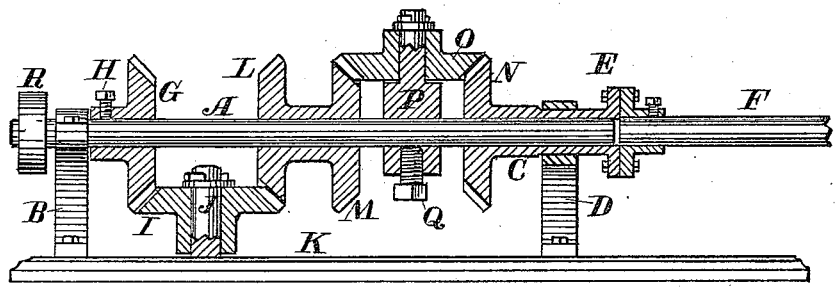
WITNESSES:
C. D. Strock
E. A. Ware
INVENTOR:
G. H. Chappell
BY
ATTORNEY

UNITED STATES PATENT OFFICE.

GEORGE H. CHAPPELL, OF NEW YORK, N. Y.

MECHANISM FOR CHANGING SPEED.

SPECIFICATION forming part of Letters Patent No. 441,281, dated November 25, 1890.

Application filed July 23, 1890. Serial No. 359,628. (No model.)

*To all whom it may concern:*

Be it known that I, GEORGE H. CHAPPELL, a citizen of the United States, and a resident of New York, in the county of New York and State of New York, have invented certain new and useful Improvements in Mechanism for Changing Speed, of which the following is a specification.

The object of my invention is to provide a simple and easily-applied mechanism for increasing and decreasing speed by means of a train of gearing, whereby positive motion is imparted without the use of belts or pulleys and dispensing with counter-shafts or other like auxiliaries usually employed for this purpose.

The drawing represents a longitudinal sectional view of a train of gearing mounted on shafting A. One end of the shafting is journaled in the block B, while its opposite end is sheathed in a tubular shaft C, the latter of which is journaled in the block D. The outer end of the tubular shaft C has a coupler-head E, by means of which it may be attached to a line-shaft F. It will thus be seen that while the shafts A and F are on a line with each other the former is free to turn within the tubular shaft C attached to the latter.

In arranging the gearing on the shaft I place the miter-gear G on the shaft A near the block B and secure it by means of the set-screw H. The second gear I is journaled to a post J, which is secured to the base K. The gear L, which meshes with the gear I, is placed loosely on the shaft A, and this latter gear has teeth on its opposite side or a gear-wheel M, integral therewith. The tubular shaft C has a gear N on its inner end facing the gear M, and interposed between the two gears is a gear O, journaled to an arm P, which is secured to the shaft A by means of the set-screw Q. It will thus be observed that only the first gear G and the arm P, which carries the gear O, are secured to the shaft, while the other gears and the tubular shaft C are placed loosely on the shaft, so that in action the gear G and arm P rotate with the shaft A. When the shaft A rotates, the gears L M are caused to travel in the opposite direction to the movement of the shaft A and at the same rate of speed, and since the gear O also travels with the shaft A the result is that the gear N is turned three revolutions while the shaft A performs one revolution. The shaft F being attached to the tubular shaft C, a speed of three to one is obtained, provided all the gear-wheels are of the same size on these shafts, as herein shown. It is obvious that the ratio between the movements of the shafts A F may be changed by changing the diameter of certain gears in the train; but such alterations are not departures from the spirit of my invention, which consists in increasing or decreasing motion in a regular ratio by a train of gearing on a single line of shafting. It should also be observed that the shafting F, while its speed is three times greater than the shaft A, travels in the same direction, and that while, as shown in the drawing, the power is applied to the pulley R, in order to increase the speed in the shaft F at the opposite end it is obvious that the power could be applied first to the shaft F and thus decreased motion imparted to the shaft A.

The application of this invention to bicycles, lathes, looms, and other kinds of mechanism is manifest, as it can be easily applied, particularly where economy of space is required, since only two bearings are necessary, and the motion imparted is positive.

Should it be desired to still further increase the ratio of speed in the shaft to which motion is transmitted, the gears represented by I L M O N can be duplicated and the shaft A lengthened to receive them. Thus the new series of gears would require the first of the set, as in G, to be placed on the tubular shaft C, the shaft being extended to accommodate it, and the other gears following in their order. Thus the speed can be again increased three times, and so on, which would be a mere duplication of the device, as herein illustrated, and will not need to be specifically illustrated or described for that reason.

What I claim as new is—

In mechanism for changing speed, the combination of a main shaft mounted in bearings secured to a base, a miter-gear secured on said shaft, a miter-gear journaled on a post on the base and engaging said first-mentioned gear, a double-faced miter-gear loose on the main shaft, one face engaging the gear on the post, a loose gear on an arm attached to the main shaft, said loose gear also engaging one face of the double-faced gear, a gear integral with a tubular shaft mounted on the main shaft, said last-mentioned gear engaging said loose gear on said arm, and a line-shaft connected with said tubular shaft, substantially as set forth.

Signed at New York, in the county of New York and State of New York, this 22d day of July, A. D. 1890.

GEORGE H. CHAPPELL.

Witnesses:
 I. S. ELKINS,
 J. S. ZERBE.